(12) United States Patent
Takata

(10) Patent No.: US 9,292,051 B2
(45) Date of Patent: Mar. 22, 2016

(54) TOUCH PAD INPUT DEVICE

(71) Applicant: ALPS ELECTRIC CO., LTD., Tokyo (JP)

(72) Inventor: Masahiro Takata, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/579,495

(22) Filed: Dec. 22, 2014

(65) Prior Publication Data

US 2015/0185769 A1    Jul. 2, 2015

(30) Foreign Application Priority Data

Dec. 26, 2013    (JP) ................. 2013-268219

(51) Int. Cl.
| | |
|---|---|
| *G06F 3/045* | (2006.01) |
| *G06F 1/16* | (2006.01) |
| *G06F 3/041* | (2006.01) |
| *G06F 3/0338* | (2013.01) |
| *G06F 3/0354* | (2013.01) |

(52) U.S. Cl.
CPC ............. *G06F 1/169* (2013.01); *G06F 3/0338* (2013.01); *G06F 3/03547* (2013.01); *G06F 3/0414* (2013.01); *G06F 2200/1636* (2013.01)

(58) Field of Classification Search
CPC .......... G06F 3/0338; G06F 2200/1636; G06F 3/03547; G06F 3/041; G06F 3/0414; G06F 2203/04105; G06F 3/044

USPC ................... 345/173–178; 178/18.01–18.09, 178/20.01–20.04
See application file for complete search history.

(56) References Cited

U.S. PATENT DOCUMENTS

| | | | | |
|---|---|---|---|---|
| 9,019,204 | B2 * | 4/2015 | Kabasawa et al. | 345/156 |
| 9,176,619 | B2 * | 11/2015 | Takata et al. | |
| 2012/0205165 | A1 * | 8/2012 | Strittmatter et al. | 178/18.01 |
| 2013/0207928 | A1 * | 8/2013 | Takata et al. | 345/174 |
| 2015/0046734 | A1 * | 2/2015 | Kabasawa et al. | 713/323 |

FOREIGN PATENT DOCUMENTS

| | | | |
|---|---|---|---|
| JP | 2007-299043 A | 11/2007 | |
| JP | 2013-164699 A | 8/2013 | |

* cited by examiner

*Primary Examiner* — Vijay Shankar
(74) *Attorney, Agent, or Firm* — Brinks Gilson & Lione

(57) ABSTRACT

A touch pad input device includes a movable element having an operation surface that serves as an upper surface, a first sensing unit for sensing a touch or proximity of an operating object on or to the operation surface, a stationary element disposed under the movable element, a rotation support mechanism rotatably supporting the movable element, a second sensing unit for sensing rotation of the movable element, and a retaining mechanism retaining the movable element. The rotation support mechanism includes fulcrum portions arranged on one of the movable element and the stationary element and abutment portions arranged on the other one of the movable element and the stationary element. The retaining mechanism is positioned under the movable element in an area covered by the operation surface when viewed from above. The retaining mechanism urges the movable element downward to hold the fulcrum portions in pressure contact with the abutment portions.

7 Claims, 13 Drawing Sheets

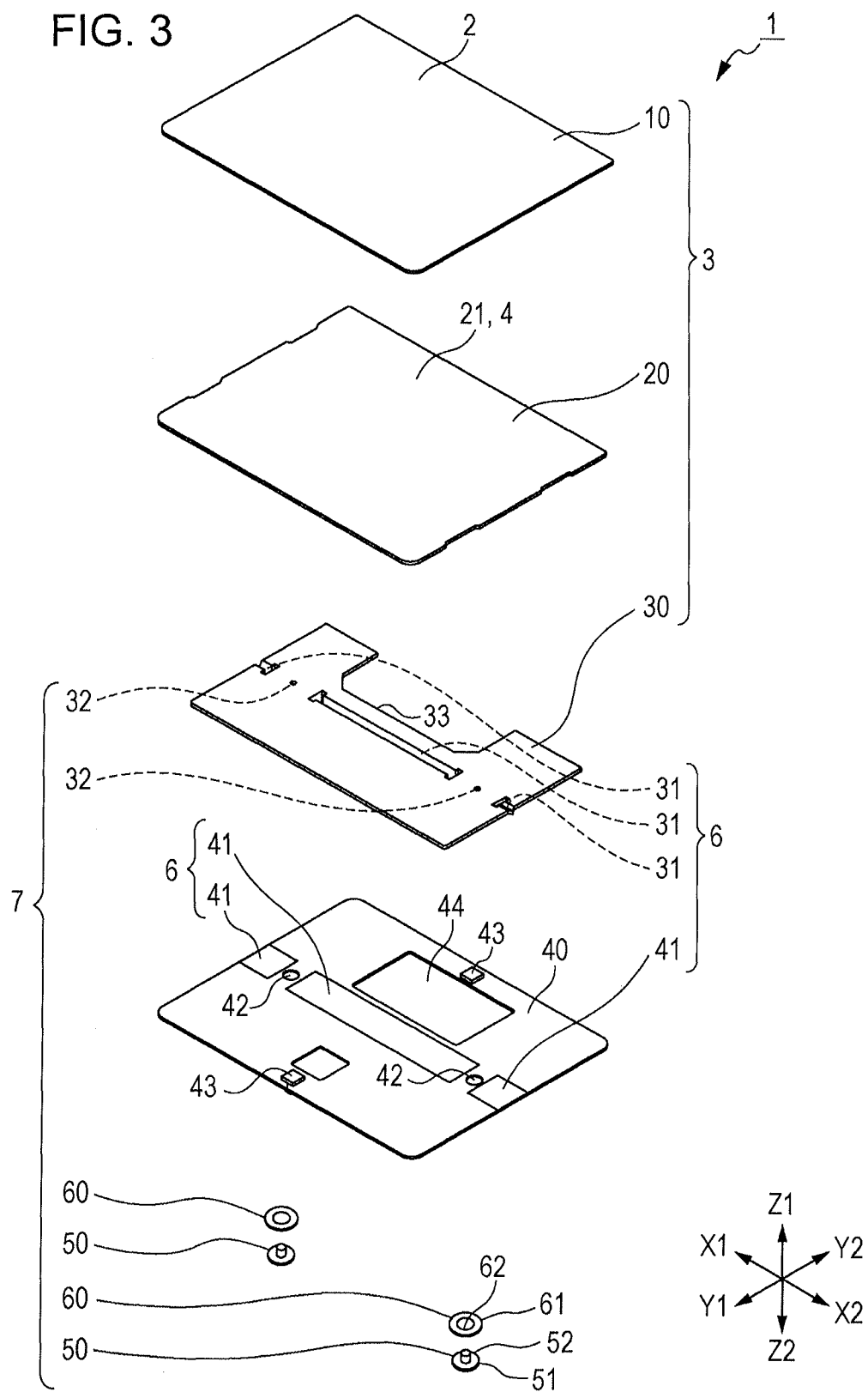

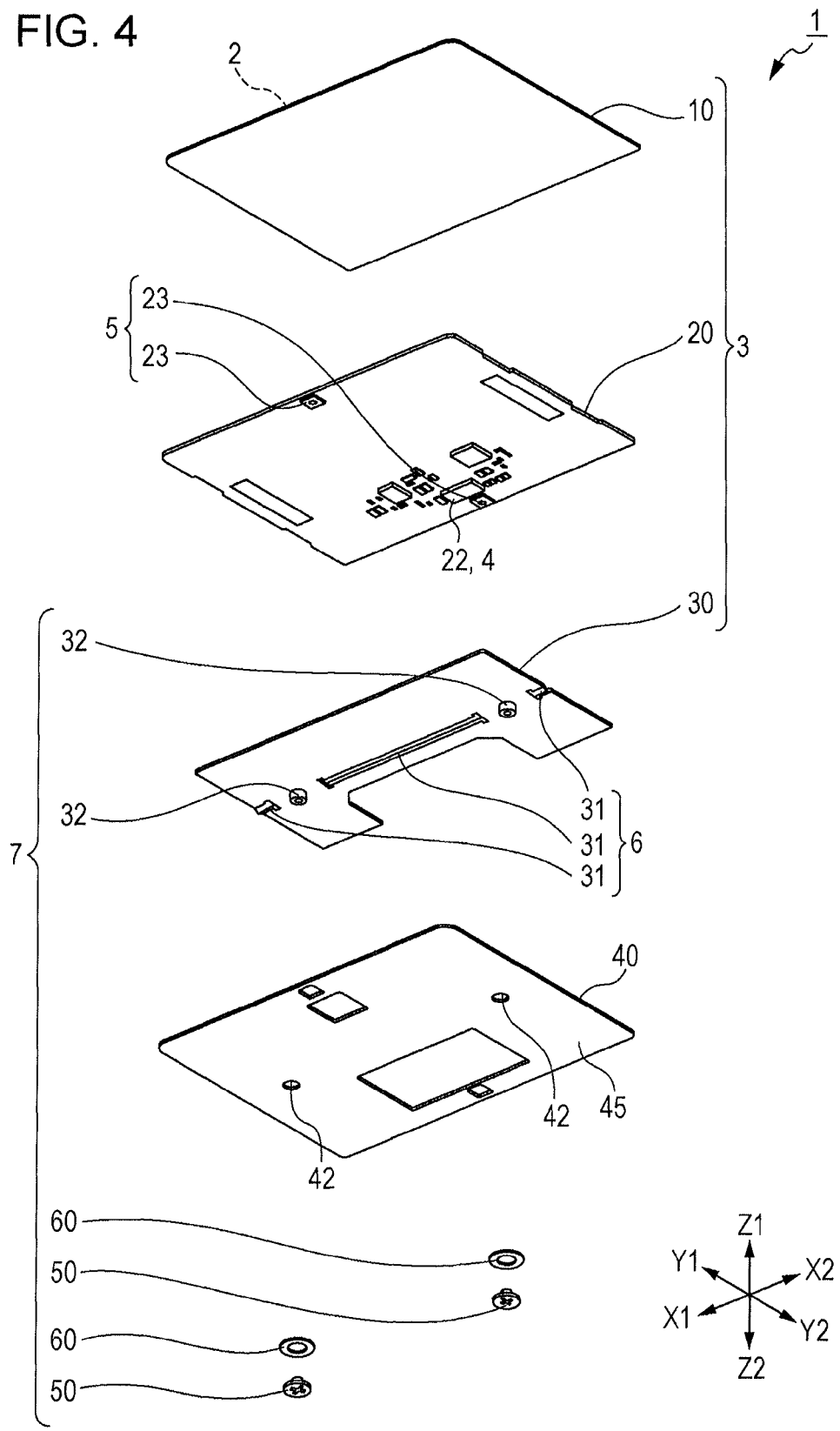

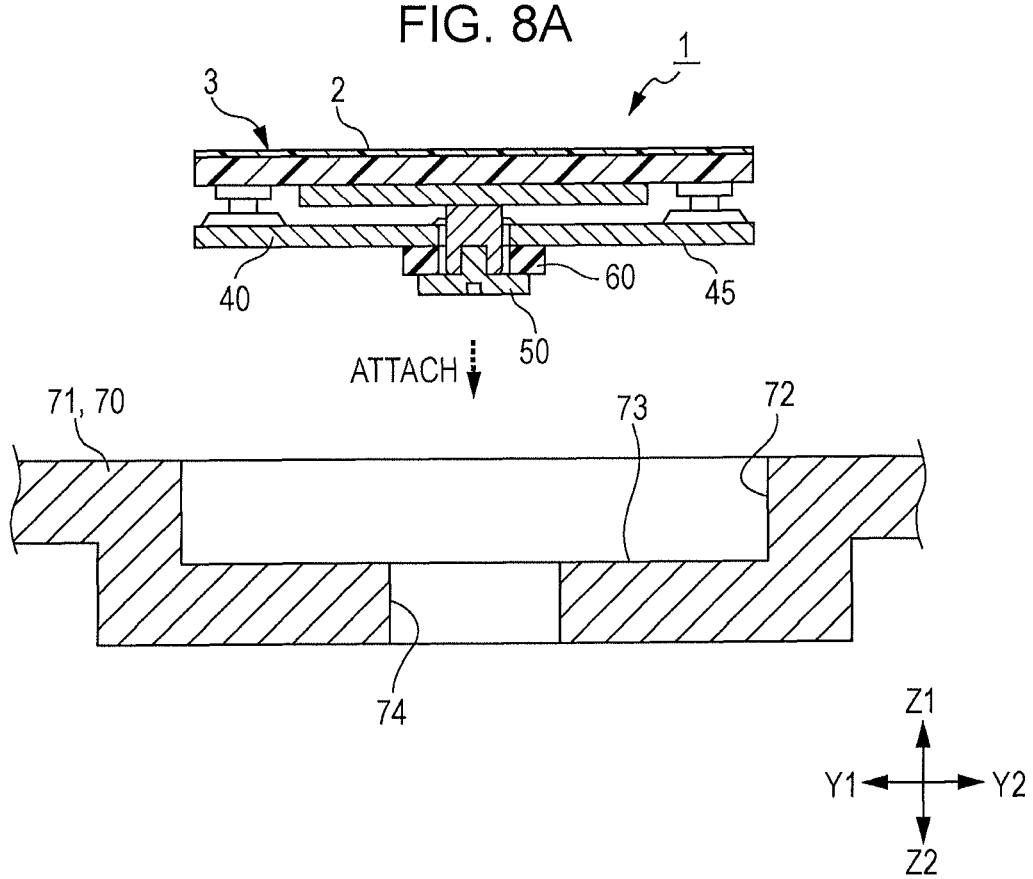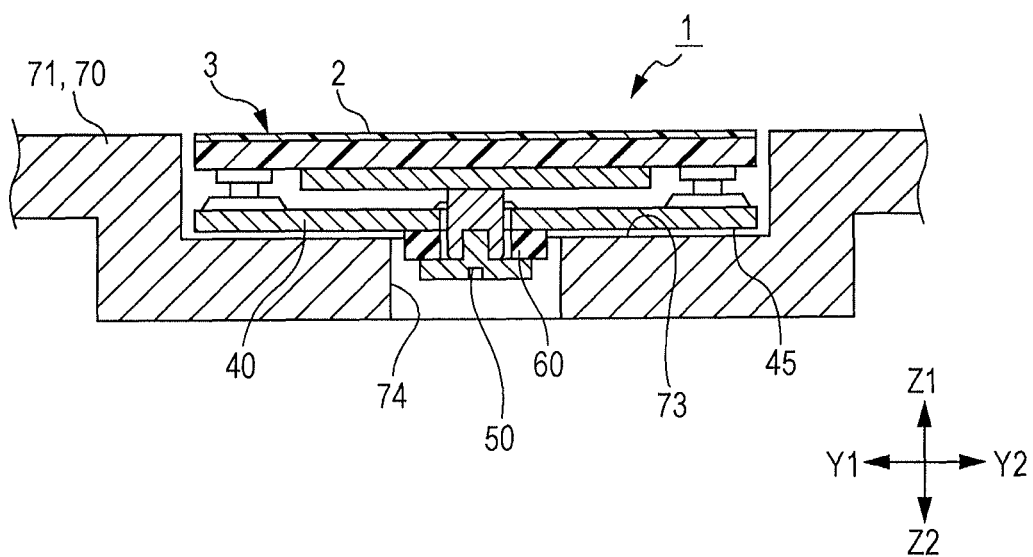

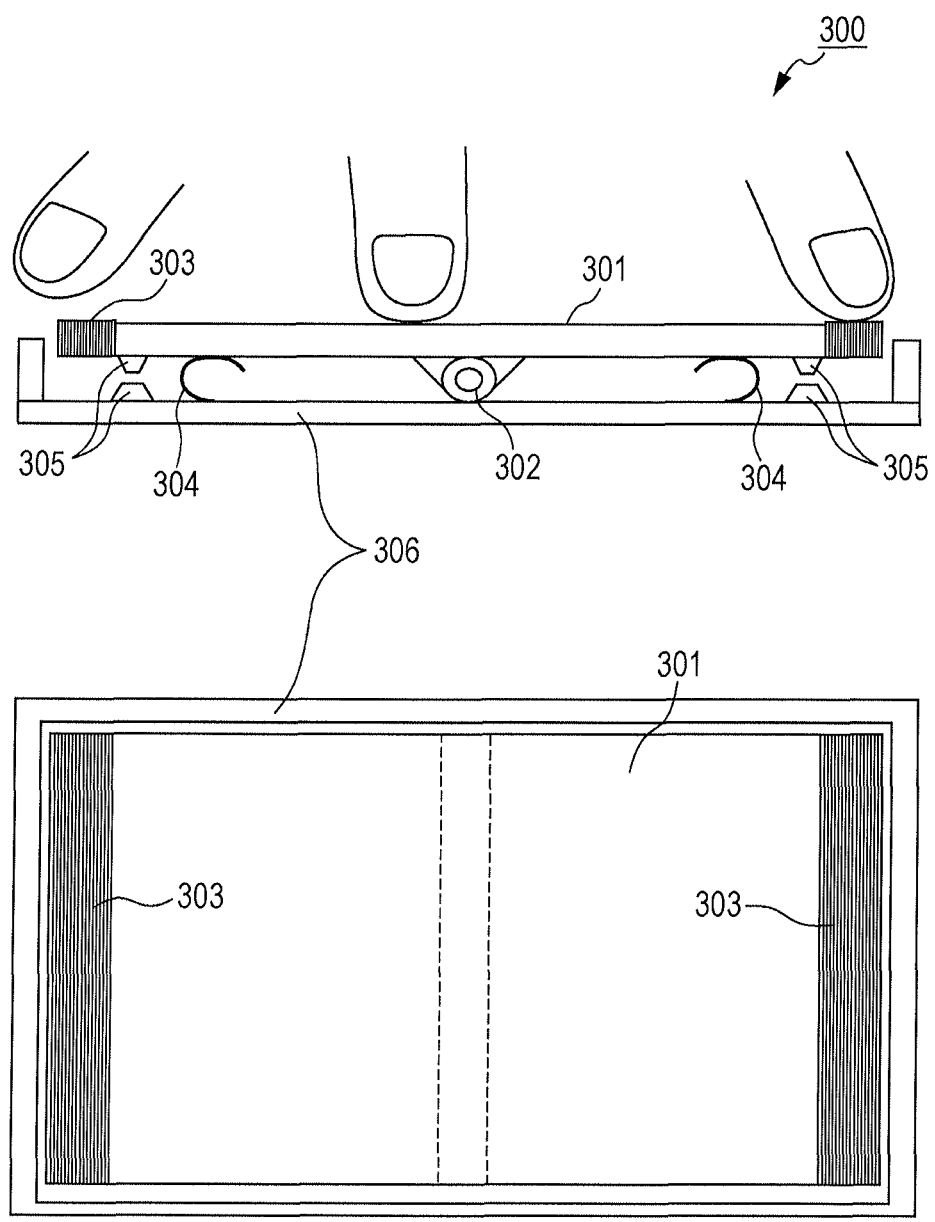

TOUCH PAD INPUT DEVICE

CLAIM OF PRIORITY

This application claims benefit of priority to Japanese Patent Application No. 2013-268219 filed on Dec. 26, 2013, which is hereby incorporated by reference in its entirety.

BACKGROUND

1. Field of the Disclosure

The present disclosure relates to a touch pad input device including a touch pad capable of sensing a touch or proximity of an operating object on or to an operation surface and a sensing unit capable of sensing a pressing operation on the touch pad.

2. Description of the Related Art

Touch pad input devices each including a touch pad capable of sensing a touch or proximity of an operating object on or to an operation surface and a sensing unit capable of sensing a pressing operation on the touch pad are currently in practical use. A touch pad input device is mounted at a predetermined position (palm rest or the like) in a housing of an electronic apparatus, such as a laptop computer, and is used to, for example, move a cursor on a screen.

Examples of related-art touch pad input devices include a three-dimensional data input device (touch pad input device) disclosed in Japanese Unexamined Patent Application Publication No. 2007-299043 and an input device (touch pad input device) disclosed in Japanese Unexamined Patent Application Publication No. 2013-164699. FIG. 12 is a diagram illustrating the configuration of a three-dimensional data input device 300 disclosed in Japanese Unexamined Patent Application Publication No. 2007-299043. FIG. 13 is a diagram illustrating the configuration of an input device 400 disclosed in Japanese Unexamined Patent Application Publication No. 2013-164699.

As illustrated in FIG. 12, the three-dimensional data input device 300 includes a rectangular touch panel (touch pad) 301 disposed above a substrate 306, two press borders 303 to be pressed, a support mechanism 304 for supporting the touch panel 301, and two contact pairs 305 corresponding one-to-one to the two press borders 303.

The touch panel 301 is a resistive, capacitive, or optical touch pad to input two-dimensional position data. The touch panel 301 includes a rotating shaft 302 in its rectangular central part and is rotatable about the rotating shaft 302, serving as a fulcrum. The two press borders 303 are arranged in both side portions of the touch panel 301. The support mechanism 304 includes two elastic members arranged between the touch panel 301 and the substrate 306. The support mechanism 304 keeps the touch panel 301 in a horizontal position under no pressure.

The two contact pairs 305 are arranged under and near the two press borders 303. When the touch panel 301 is rotated, one pair of the two contact pairs 305 is activated to output a contact signal indicating a rotating direction. The three-dimensional data input device 300 detects two-dimensional position data (indicating the position of an operating object in contact with or in proximity to an operation surface) based on an output of the touch panel 301 and detects three-dimensional direction data (pressing operation) based on an output of either of the two contact pairs 305.

As illustrated in FIG. 13, the input device 400 includes a panel 402, serving as a portion of a housing of a personal computer or the like, an operation substrate 410 located within an opening 403 of the panel 402, and a support structure portion 440a for supporting the operation substrate 410 with a lower surface of the panel 402.

The operation substrate 410 is a capacitive touch pad. The operation substrate 410 includes a metal plate (not illustrated), a sensor substrate (not illustrated) stacked on the metal plate, and a cover sheet 415 stacked on the sensor substrate. The cover sheet 415 has a surface, serving as an operation surface 415a. A pressing force sensor (not illustrated) is disposed under the operation substrate 410. In the input device 400, the operation substrate 410 senses a touch or proximity of an operating object, such as a finger, on or to the operation substrate 410 and the pressing force sensor senses a pressing force applied to the operation substrate 410.

The support structure portion 440a includes a support portion 404 included in the lower surface of the panel 402, a connection portion 424a provided for an end of the operation substrate 410, an elastic body 441 retained by the connection portion 424a, and a retaining member 442 for screwing. The support portion 404 is a flat portion included in the lower surface of the panel 402 and is parallel to a front surface 402a of the panel 402. The support portion 404 has an internally-threaded hole 405 and includes a positioning projection 406 and a stopper projection 407.

The connection portion 424a extends outwardly from a step portion 423a provided at the end of the operation substrate 410. The connection portion 424a has a retaining hole 427a and a positioning hole 428a. The connection portion 424a has an opposing region 407a in its upper surface. The opposing region 407a faces the stopper projection 407.

The elastic body 441 includes an upper elastic portion 441b and a lower elastic portion 441c and has a through hole 441d extending through central part of the elastic body 441, a retaining groove 441a disposed between the upper elastic portion 441b and the lower elastic portion 441c, and a cross-shaped groove 441e in the upper elastic portion 441b. The retaining member 442 includes a disk-shaped facing member 442a and has a lower surface 442e with a fit groove to which a screwdriver is to be fitted. The retaining member 442 further includes a shaft portion 442b extending upwardly from the facing member 442a, a step portion 442c, serving as an upper end of the shaft portion 442b, and an externally-threaded portion 442d.

The elastic body 441 is retained in the retaining hole 427a of the connection portion 424a, the shaft portion 442b of the retaining member 442 is inserted into the through hole 441d of the elastic body 441, and the externally-threaded portion 442d is threaded into the internally-threaded hole 405 of the panel 402, thus urging the operation substrate 410 upward. Upwardly urging the operation substrate 410 enables the operation substrate 410 to be retained.

In such a touch pad input device, the touch pad has to be securely retained so as not to be detached from the housing of the electronic apparatus when the touch pad is pressed. With the modern trend toward smaller electronic apparatuses, such as laptop computers, there has been an increasing demand for smaller footprints of touch pad input devices mounted in the electronic apparatuses.

Japanese Unexamined Patent Application Publication No. 2007-299043 discloses a method of supporting the touch panel 301 of the three-dimensional data input device 300 such that the touch panel 301 can be pressed. However, there is no mention of any method of retaining the touch panel 301 so as not to detach the touch panel 301 from the substrate.

In the input device 400 disclosed in Japanese Unexamined Patent Application Publication No. 2013-164699, the connection portion 424a of the operation substrate 410 is screwed on the panel 402, with the elastic body 441 therebetween.

Consequently, the operation substrate 410 is supported such that the operation substrate 410 can be pressed. Additionally, the operation substrate 410 is securely retained so as not to be detached from the panel 402 when the operation substrate 410 is pressed.

In the input device 400, the operation substrate 410 is urged upward. To urge the operation substrate 410 upward, the connection portion 424a has to be deviated from the operation substrate 410 so as to avoid the operation surface when viewed from above. This leads to an increased footprint of the input device 400. This interferes with miniaturization of an electronic apparatus in which the input device 400 is mounted.

SUMMARY

A touch pad input device includes a movable element having an upper surface that serves as an operation surface, a first sensing unit for sensing a touch or proximity of an operating object on or to the operation surface, a stationary element disposed under the movable element, a rotation support mechanism rotatably supporting the movable element, a second sensing unit for sensing rotation of the movable element, and a retaining mechanism retaining the movable element. The rotation support mechanism includes a plurality of fulcrum portions arranged on one of the movable element and the stationary element such that the fulcrum portions are positioned under the movable element in an area covered by the operation surface when viewed from above. The rotation support mechanism further includes a plurality of abutment portions arranged on the other one of the movable element and the stationary element so as to contact with the fulcrum portions. The retaining mechanism is positioned under the movable element in the area covered by the operation surface when viewed from above. The retaining mechanism urges the movable element downward to hold the fulcrum portions in pressure contact with the abutment portions.

In this touch pad input device, the retaining mechanism urges the movable element downward to hold the fulcrum portions arranged on one of the movable element and the stationary element in pressure contact with the abutment portions arranged on the other one of the movable element and the stationary element, thus securely retaining the movable element. Since the retaining mechanism urges the movable element downward, the retaining mechanism can be placed under the movable element. The placement of the retaining mechanism under the movable element allows a reduction in footprint of the touch pad input device. Thus, the touch pad input device with the above-described configuration includes the touch pad retained securely and has a small footprint.

In the touch pad input device, the stationary element may have an opening extending through the stationary element from an upper surface of the stationary element to a lower surface thereof at a predetermined position. The retaining mechanism may urge the movable element from under the stationary element through the opening.

In this touch pad input device, the stationary element has the opening extending through the stationary element from the upper surface to the lower surface thereof at the predetermined position, and the retaining mechanism urges the movable element from under the stationary element through the opening. Thus, part of the retaining mechanism can be placed under the stationary element. The placement of the part of the retaining mechanism under the stationary element allows a reduction of constraints on the height of the retaining mechanism, leading to a greater degree of flexibility in the way that the movable element is retained. This facilitates retaining the movable element.

In the touch pad input device, the retaining mechanism may include a protrusion fastened to a lower surface of the movable element and the protrusion may extend through the opening beyond the lower surface of the stationary element. The retaining mechanism may further include a screw member screwed on a lower end of the protrusion and the screw member may include a head wider than the protrusion. The retaining mechanism may further include an elastic member interposed between the stationary element and the head of the screw member and the elastic member may elastically urge the protrusion downward.

In this touch pad input device, the retaining mechanism can include three components, that is, the protrusion, the screw member, and the elastic member. This enables the retaining mechanism to have a simplified configuration.

In the touch pad input device, the retaining mechanism may include a screw member extending from under the stationary element through the opening and being screwed on the movable element, and an elastic member elastically urging the movable element downward. The screw member may include a stem extending through the opening beyond the upper surface of the stationary element, and a head wider than the stem. The elastic member may be interposed between the stationary element and the head of the screw member.

In this touch pad input device, the retaining mechanism can include two components, that is, the screw member and the elastic member. This enables the retaining mechanism to have a greatly simplified configuration.

In the touch pad input device, the fulcrum portions may be arranged on the axis of rotation of the movable element on opposite sides of the retaining mechanism.

In this touch pad input device, the fulcrum portions are arranged on the axis of rotation of the movable element on the opposite sides of the retaining mechanism. Thus, the retaining mechanism can be supported by the fulcrum portions arranged on the opposite sides of the retaining mechanism. The movable element can be retained more stably.

In the touch pad input device, the fulcrum portions may be downwardly projecting ridges formed by partly bending the movable element along the axis of rotation of the movable element.

In this touch pad input device, the fulcrum portions are formed by partly bending the movable element. This leads to a simplified configuration of the movable element as well as suppression of an increase in the number of parts.

In the touch pad input device, the fulcrum portions may be upwardly projecting ridges formed by partly bending the stationary element along the axis of rotation of the movable element.

In this touch pad input device, the fulcrum portions are formed by partly bending the stationary element. This leads to a simplified configuration of the stationary element as well as suppression of an increase in the number of parts.

BRIEF DESCRIPTION OF THE DRAWINGS

FIG. 3 is an exploded perspective view of the touch pad input device illustrated in FIG. 2 when viewed from above;

FIG. 4 is an exploded perspective view of the touch pad input device in FIG. 2 when viewed from below;

FIGS. 8A and 8B are diagrams illustrating how to attach the touch pad input device in FIG. 2 to an electronic apparatus;

FIG. 12 is a diagram illustrating the configuration of a three-dimensional data input device disclosed in Japanese Unexamined Patent Application Publication No. 2007-2999043.

DESCRIPTION OF THE EXEMPLARY EMBODIMENTS

First Embodiment

Figure 1A:
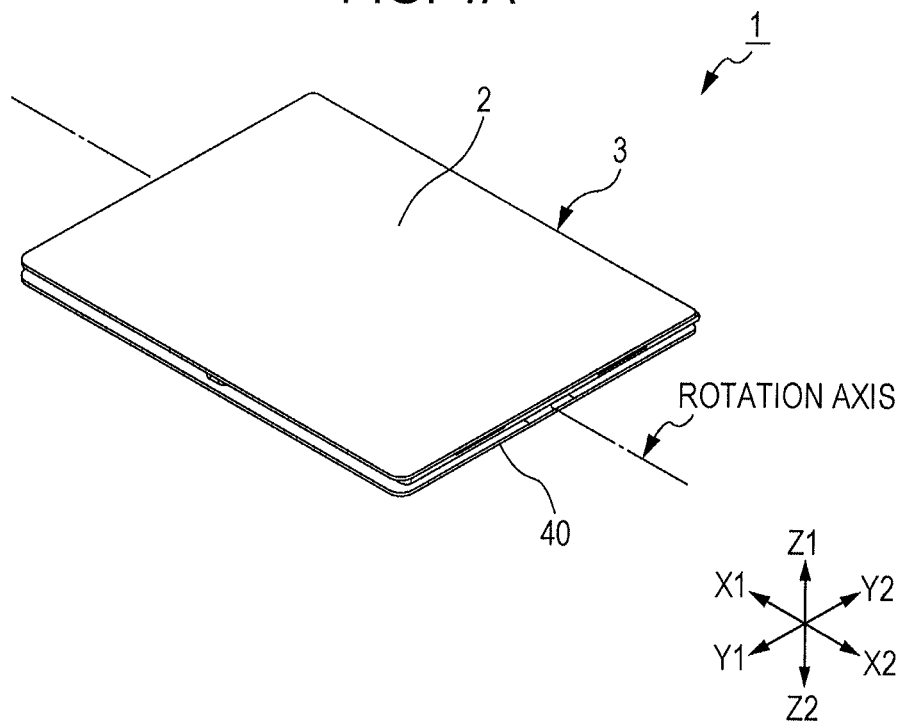
FIGS. 1A and 1B are diagrams illustrating an exemplary configuration of a touch pad input device according to a first embodiment of the present invention.

A first embodiment of the present invention will be described with reference to the drawings. In the drawings, X1 denotes a leftward direction, X2 denotes a rightward direction, Y1 denotes a forward direction, Y2 denotes a backward direction, Z1 denotes an upward direction, and Z2 denotes a downward direction.

Figure 1B:
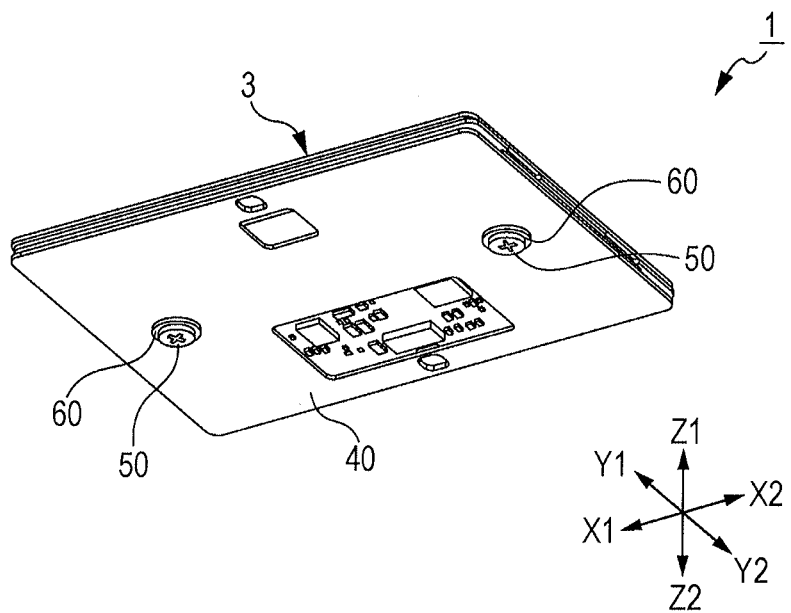
Figure 2:
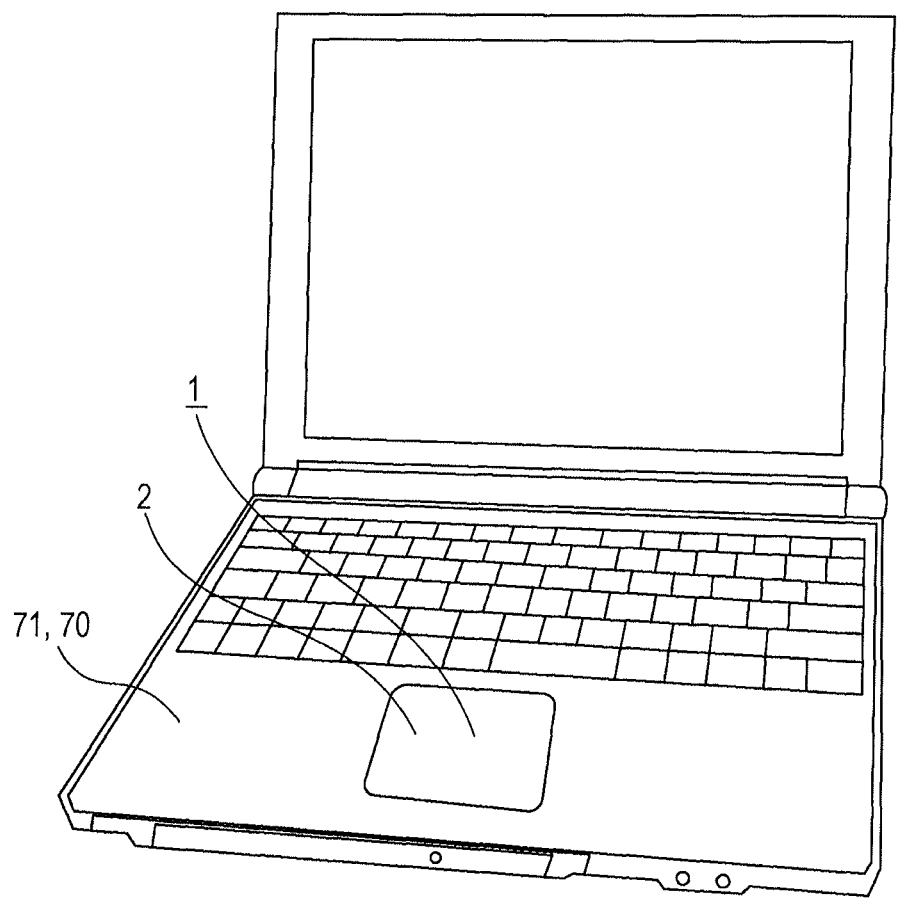
FIG. 2 is a diagram illustrating an example of use of the touch pad input device illustrated in FIGS. 1A and 1B.
Figure 5A:
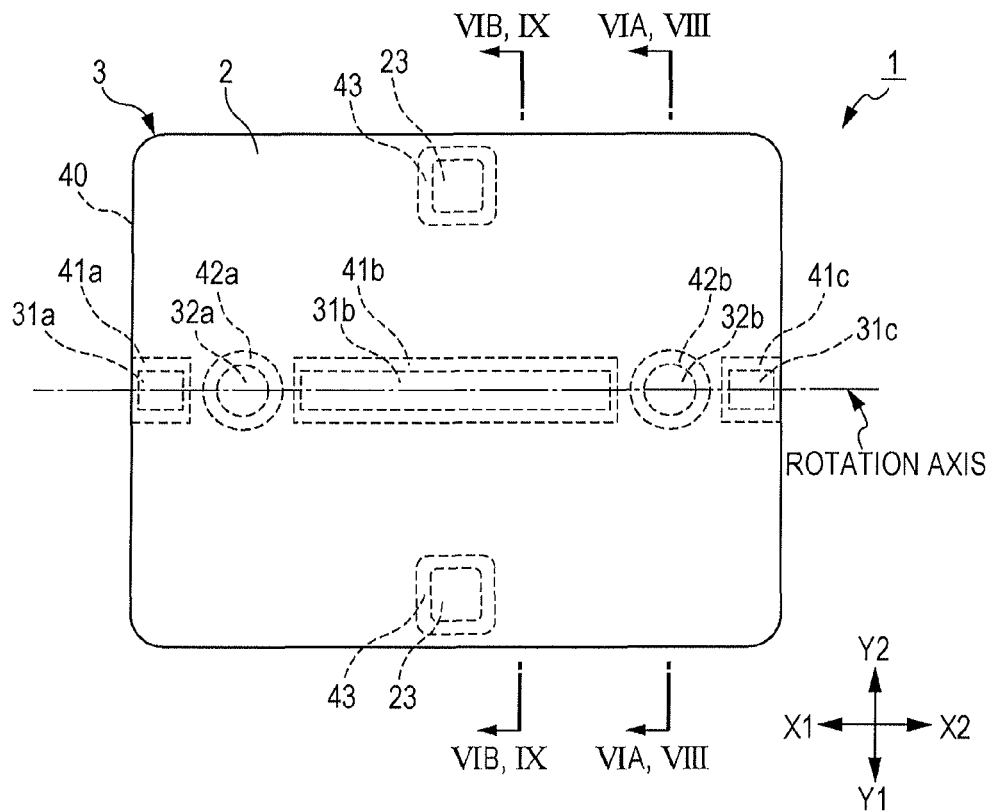
FIGS. 5A and 5B are first diagrams illustrating the configuration of the touch pad input device in FIG. 2.
Figure 5B:
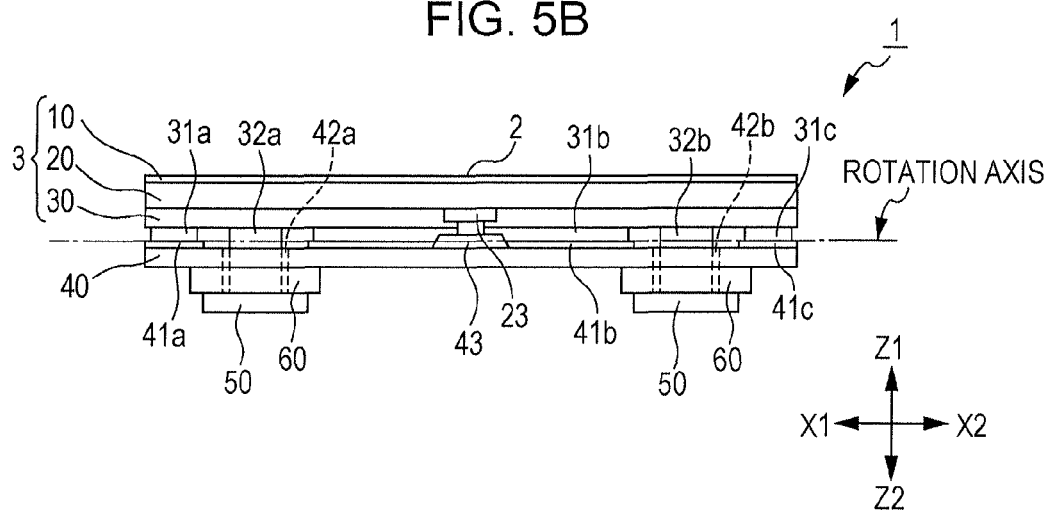
Figure 6A:
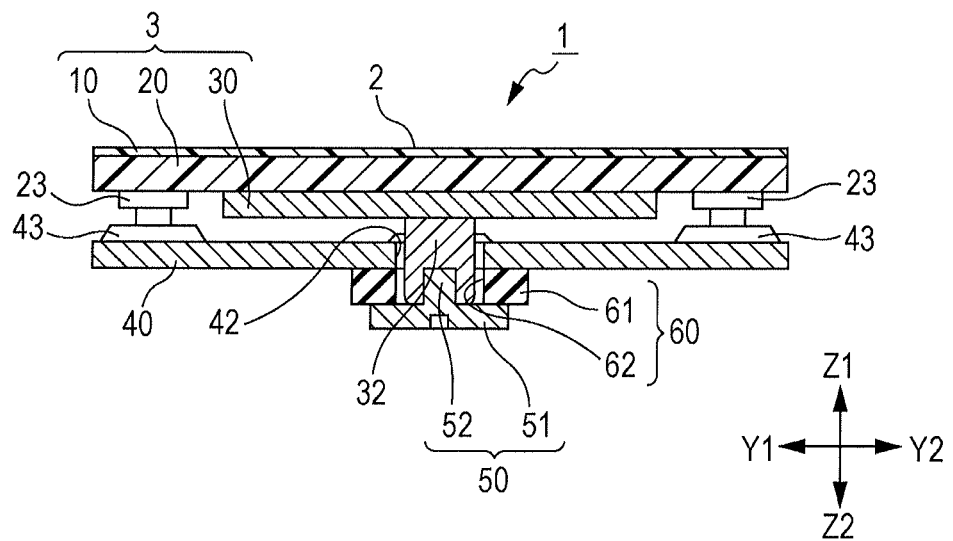
FIGS. 6A and 6B are second diagrams illustrating the configuration of the touch pad input device in FIG. 2.
Figure 6B:
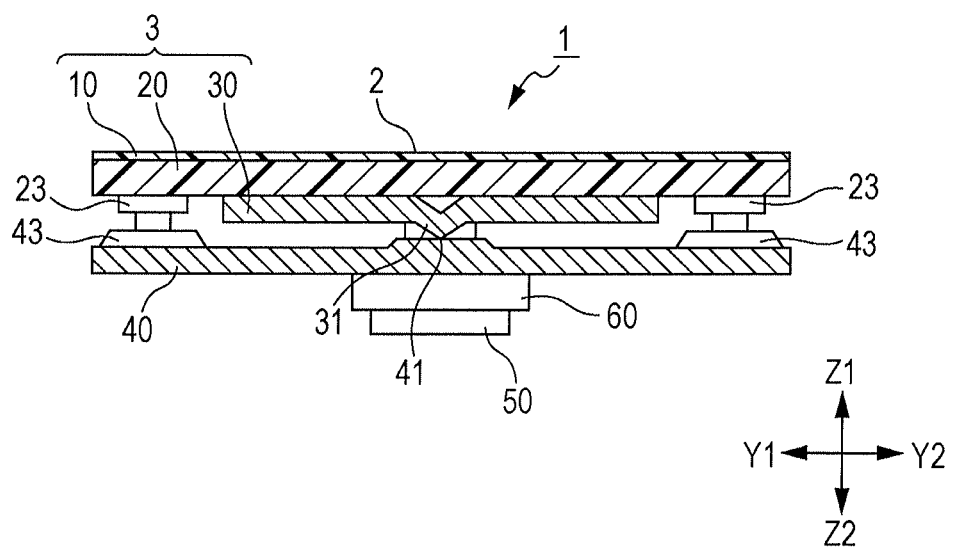

The configuration of a touch pad input device 1 according to the first embodiment of the present invention will now be described with reference to FIGS. 1A to 6B. FIGS. 1A and 1B are diagrams illustrating the configuration of the touch pad input device 1 according to the first embodiment. FIG. 1A is a perspective view of the touch pad input device 1 when viewed from above. FIG. 1B is a perspective view of the touch pad input device 1 when viewed from below. FIG. 2 is a diagram illustrating an example of use of the touch pad input device 1 illustrated in FIGS. 1A and 1B. FIG. 3 is an exploded perspective view of the touch pad input device 1 illustrated in FIG. 2 when viewed from above. FIG. 4 is an exploded perspective view of the touch pad input device 1 in FIG. 2 when viewed from below. FIGS. 5A and 5B are first diagrams illustrating the configuration of the touch pad input device 1 in FIG. 2. FIG. 5A is a schematic view of the touch pad input device 1 when viewed from above. FIG. 5B is a schematic view of the touch pad input device 1 when viewed from front. FIGS. 6A and 6B are second diagrams illustrating the configuration of the touch pad input device 1 in FIG. 2. FIG. 6A is a schematic cross-sectional view of the touch pad input device 1 taken along the line VIA-VIA in FIG. 5A. FIG. 6B is a schematic cross-sectional view of the touch pad input device 1 taken along the line VIB-VIB in FIG. 5A.

As illustrated in FIGS. 1A and 1B, the touch pad input device 1 includes a touch pad (movable element) 3 having a substantially rectangular operation surface 2, serving as an upper surface, a fixed plate (stationary element) 40 disposed under the touch pad 3, two screw members 50, and two elastic members 60, each of which is interposed between the fixed plate 40 and the screw member 50. The touch pad 3 is rotatably supported above the fixed plate 40 and is retained so as not to be detached from the fixed plate 40. The axis of rotation (hereinafter, referred to as the "rotation axis") of the touch pad 3 coincides with a straight line extending laterally from the center of the operation surface 2 when viewed from above.

The touch pad input device 1 is capable of sensing the position of an operating object in contact with or in proximity to the operation surface 2. Front part and back part of the touch pad 3 can be pressed downward. When the operation surface 2 is pressed, such an operation can be sensed as an input operation. In the following description, pressing the front part or the back part of the touch pad 3 will be referred to as a "pressing operation" or "pressing".

Referring to FIG. 2, the touch pad input device 1 is mounted in an electronic apparatus 70, such as a laptop computer, such that the operation surface 2 is exposed at a predetermined position (for example, a palm rest) in a housing 71 of the electronic apparatus 70. The touch pad input device 1 is used to, for example, move a cursor on a screen.

The touch pad 3 is of a capacitive type. As illustrated in FIGS. 3 to 4, the touch pad 3 includes an operation plate 10, a substrate 20, and a support plate 30 superposed on one another. The operation plate 10 is a thin plate-shaped plastic member and has an upper surface and a lower surface, which are substantially rectangular and planar. The upper surface of the operation plate 10 serves as the operation surface 2.

The substrate 20 is a plastic printed wiring board. As illustrated in FIGS. 3 and 4, the substrate 20 has an upper surface and a lower surface, which are substantially rectangular and planar. The upper surface of the substrate 20 serves as an electrode arrangement surface 21 in which a group of capacitive sensing electrodes (not illustrated) are arranged. Electric components mounted at predetermined positions on the lower surface of the substrate 20 constitute a sensing circuit 22. The sensing circuit 22 is connected to the capacitive sensing electrode group in the electrode arrangement surface 21 by wiring electrodes (not illustrated). The sensing circuit 22 and the capacitive sensing electrode group in the electrode arrangement surface 21 constitute a first sensing unit 4 for sensing a touch or proximity of an operating object on or to the operation surface 2.

The principle of sensing a touch or proximity of an operating object on or to a capacitive touch pad, a pattern shape of a capacitive sensing electrode group in this pad, and the circuitry of a sensing circuit in the pad are known, and a detailed description of them are omitted. The first sensing unit 4 senses the position of an operating object in contact with or in proximity to the operation surface 2 based on a change in capacitance sensed by using the capacitive sensing electrode group in the electrode arrangement surface 21.

Referring to FIG. 4, two push switches 23 are mounted on the lower surface of the substrate 20. Referring to FIGS. 6A and 6B, one of the two push switches 23 is mounted on a front end of the lower surface of the substrate 20 and the other one of the two push switches 23 is mounted on a back end of the lower surface of the substrate 20. A lower end of each push switch 23 can be pressed upward. The push switches 23 function as a second sensing unit 5 for sensing a pressing operation on the touch pad 3.

The support plate 30 is a member rotating together with the substrate 20. The support plate 30 is a plate-shaped metal member. As illustrated in FIGS. 3 and 4, the support plate 30 has an upper planar surface and a lower planar surface. Three fulcrum portions 31, serving as fulcra for rotation of the touch pad 3, are arranged on the lower surface of the support plate 30 such that the fulcrum portions 31 are arranged in an area covered by the operation surface 2 when viewed from above. Referring to FIGS. 5A to 6B, the fulcrum portions 31 may be downwardly projecting ridges formed by bending the support plate 30 along the rotation axis of the touch pad 3. A left fulcrum portion 31a of the three fulcrum portions 31 is located near a left edge of the support plate 30. A central fulcrum portion 31b of the three fulcrum portions 31 is located near a recess 33 of the support plate 30. A right fulcrum portion 31c of the three fulcrum portions 31 is located near a right edge of the support plate 30.

Referring to FIG. 4, two downward protrusions 32 are fastened to the lower surface of the support plate 30 such that the protrusions 32 are arranged in the area covered by the operation surface 2 when viewed from above. The protrusions 32 are substantially cylindrical. Each protrusion 32 has a threaded hole (not illustrated) in its extremity. Referring to FIGS. 5A to 6B, a left protrusion 32a of the two protrusions 32 is located between the left fulcrum portion 31a and the central fulcrum portion 31b. A right protrusion 32b of the two protrusions 32 is located between the central fulcrum portion 31b and the right fulcrum portion 31c. In other words, the left fulcrum portion 31a and the central fulcrum portion 31b are arranged on opposite sides of the left protrusion 32a and the central fulcrum portion 31b and the right fulcrum portion 31c are arranged on opposite sides of the right protrusion 32b.

As illustrated in FIG. 3, the support plate 30 has the recess 33 at a position corresponding to the sensing circuit 22 such that the electric components of the sensing circuit 22 are received in the recess 33. The recess 33 is not illustrated in FIGS. 6A, 6B, 8A, 8B, 9A, 9B, and 9C for easy understanding of a support structure of the touch pad 3. The support plate 30 can be formed by, for example, stamping a metal plate into a predetermined shape and pressing the projections 32 having a predetermined shape into holes formed in the support plate 30.

The fixed plate 40 is a plate-shaped metal member. As illustrated in FIGS. 3 and 4, the fixed plate 40 has an upper surface and a lower surface, which are substantially rectangular and planar. The fixed plate 40 includes abutment portions 41 arranged at predetermined positions on the upper surface of the fixed plate 40. The abutment portions 41, serving as flat portions, are to contact with the extremities of the three fulcrum portions 31 of the support plate 30. Referring to FIGS. 5A to 6B, a left abutment portion 41a of the three abutment portions 41 is in contact with the left fulcrum portion 31a. A central abutment portion 41b of the three abutment portions 41 is in contact with the central fulcrum portion 31b. A right abutment portion 41c of the three abutment portions 41 is in contact with the right fulcrum portion 31c.

As illustrated in FIGS. 3 and 4, the fixed plate 40 has retaining openings 42, through which the two protrusions 32 of the support plate 30 extend, arranged at predetermined positions. Referring to FIGS. 5A to 6B, the left protrusion 32a extends through a left retaining opening 42a of the two retaining openings 42 and the right protrusion 32b extends through a right retaining opening 42b of the two retaining openings 42.

Referring to FIG. 3, switch supports 43, serving as protrusions for pressing the push switches 23, are arranged on the upper surface of the fixed plate 40 so as to correspond to the push switches 23. The switch supports 43 upwardly press the lower ends of the push switches 23.

As illustrated in FIG. 3, the fixed plate 40 has a circuit opening 44 at a position corresponding to the sensing circuit 22 of the substrate 20 such that the electric components of the sensing circuit 22 are arranged within the circuit opening 44. The circuit opening 44 is not illustrated in FIGS. 6A, 6B, 8A, 8B, 9A, 9B, and 9C for easy understanding of the support structure of the touch pad 3. Referring to FIG. 4, the lower surface of the fixed plate 40 serves as an attachment surface 45 to be attached to the electronic apparatus 70. The fixed plate 40 is formed by, for example, stamping a metal plate.

The screw members 50 are metal members for screwing. As illustrated in FIG. 3, each screw member 50 includes a disk-shaped head 51 having an upper planar surface and a lower planar surface, and a threaded stem 52 extending from the upper surface of the head 51. The disk-shaped head 51 has a larger outside diameter than the cylindrical protrusion 32 of the support plate 30. Consequently, the head 51 is wider than the protrusion 32. The head 51 has a groove for receiving the tip of a screwdriver in a lower surface of the head.

The elastic members 60 are members for downwardly urging the touch pad 3. Each elastic member 60 is a ring-shaped member composed of an elastic material, such as rubber. Referring to FIG. 3, the elastic member 60 includes a ring-shaped body 61 and a circular through hole 62, through which the protrusion 32 of the support plate 30 extends.

The support structure of the touch pad 3 will now be described. In the touch pad input device 1, the fulcrum portions 31 of the support plate 30 and the abutment portions 41 of the fixed plate 40 constitute a rotation support mechanism 6 for rotatably supporting the touch pad 3. A straight line laterally extending through the extremities of the fulcrum portions 31 of the support plate 30 serves as the rotation axis of the touch pad 3.

When the front part of the touch pad 3 is pressed downward, the touch pad 3 is rotated, thus causing a front end of the touch pad 3 to move downward. When the back part of the touch pad 3 is pressed downward, the touch pad 3 is rotated, thus causing a back end of the touch pad 3 to move downward. The rotation support mechanism 6 supports the touch pad 3 rotatably in that manner.

A retaining structure of the touch pad 3 will now be described. In the touch pad input device 1, the protrusions 32 of the support plate 30, the screw members 50, and the elastic members 60 constitute a retaining mechanism 7 for retaining the touch pad 3 so as not to detach the touch pad 3 from the fixed plate 40 in a pressing operation.

The protrusions 32 of the support plate 30 downwardly protrude through the retaining openings 42 of the fixed plate 40. The extremity of each protrusion 32 extends in the through hole 62 of the elastic member 60. The screw member 50 located under the elastic member 60 is screwed on the extremity of the protrusion 32. The body 61 of the elastic member 60 is interposed between the attachment surface 45 of the fixed plate 40 and the head 51 of the screw member 50, thus downwardly urging the head 51 of the screw member 50 with its elasticity (resilience).

As the heads 51 of the screw members 50 are urged downward, the touch pad 3 is urged downward, so that the fulcrum portions 31 of the support plate 30 come into pressure contact with the abutment portions 41 of the fixed plate 40. The pressure contact of the fulcrum portions 31 of the support plate 30 and the abutment portions 41 of the fixed plate 40 reduces or prevents movement except rotation of the touch pad 3, thus preventing the touch pad 3 from being detached from the fixed plate 40 in a pressing operation. The retaining mechanism 7 retains the touch pad 3 on the fixed plate 40 in that manner.

Figure 7A:
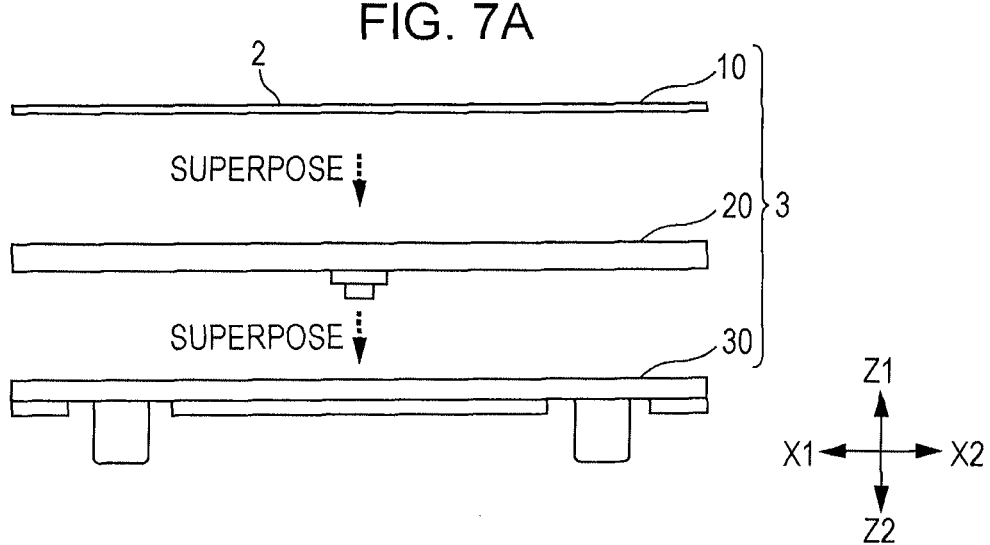
FIGS. 7A to 7C are diagrams illustrating a method of assembling the touch pad input device in FIG. 2.
Figure 7B:
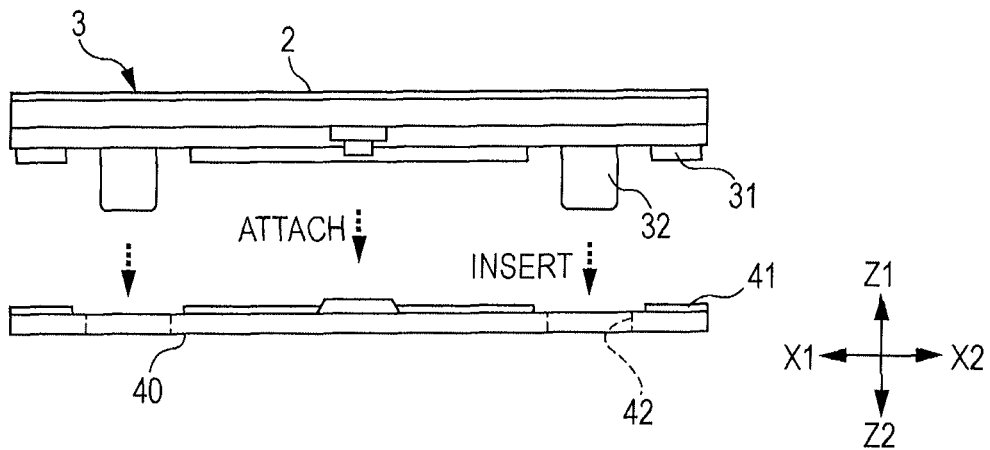
Figure 7C:
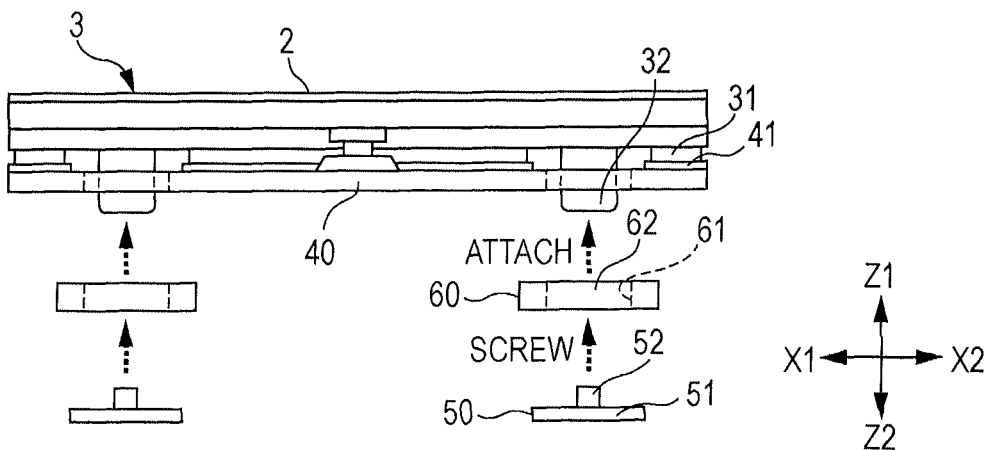

A method of assembling the touch pad input device 1 will now be described with reference to FIGS. 7A to 7C. FIGS. 7A to 7C are diagrams illustrating the method of assembling the touch pad input device 1 illustrated in FIG. 2. FIG. 7A illustrates how to laminate the touch pad 3. FIG. 7B illustrates how to attach the touch pad 3 to the fixed plate 40. FIG. 7C illustrates how to screw the screw members 50 on the protrusions 32 of the support plate 30. FIGS. 7A to 7C are schematic views of the touch pad input device 1 when viewed from front.

As illustrated in FIG. 7A, the operation plate 10, the substrate 20, and the support plate 30 are vertically arranged in layers, thus forming the touch pad 3. The operation plate 10, the substrate 20, and the support plate 30 are superposed on one another in that order from the top and are bonded together with an adhesive or the like.

Subsequently, the touch pad 3 is attached to the fixed plate 40 as illustrated in FIG. 7B. When the touch pad 3 is attached to the fixed plate 40, the fulcrum portions 31 of the support plate 30 come into contact with the abutment portions 41 of the fixed plate 40 and the protrusions 32 of the support plate 30 are inserted into, or extend through the retaining openings 42 of the fixed plate 40 and protrude downwardly.

After that, as illustrated in FIG. 7C, the extremity of each protrusion 32 of the support plate 30 is inserted into the through hole 62 of the elastic member 60 and the screw member 50 is screwed into the extremity of the protrusion 32. After the screw member 50 is screwed on the extremity of the protrusion 32, the body 61 of the elastic member 60 is interposed between the attachment surface 45 of the fixed plate 40 and the head 51 of the screw member 50. Consequently, the elastic members 60 urge the touch pad 3 downward, so that the fulcrum portions 31 of the support plate 30 are in pressure contact with the abutment portions 41 of the fixed plate 40. The touch pad input device 1 is assembled in that manner.

How to attach the touch pad input device 1 to the electronic apparatus 70 will now be described with reference to FIGS. 8A and 8B. FIGS. 8A and 8B are diagrams illustrating how to attach the touch pad input device 1 illustrated in FIG. 2 to the electronic apparatus 70. FIG. 8A illustrates a state before attachment and FIG. 8B illustrates a state after attachment. FIGS. 8A and 8B are schematic views illustrating the cross-section of the touch pad input device 1 taken along the line VIII-VIII in FIG. 5A and the cross-section of the electronic apparatus 70 taken along a line corresponding to the line VIII-VIII.

As illustrated in FIG. 8A, the housing 71 of the electronic apparatus 70 has a cavity 72 at a predetermined position. The cavity 72 conforms to the outside shape of the touch pad input device 1. The cavity 72 has a bottom surface 73 to contact with the attachment surface 45 of the touch pad input device 1. As illustrated in FIG. 8B, the touch pad input device 1 with the operation surface 2 facing upward is inserted into the cavity 72 of the housing 71. The attachment surface 45 of the touch pad input device 1 is bonded to the bottom surface 73 of the cavity 72 with an adhesive or the like.

The bottom surface 73 of the cavity 72 of the housing 71 has attachment openings 74. The screw members 50 and the elastic members 60 downwardly protruding from the attachment surface 45 of the touch pad input device 1 are received in spaces defined by the respective attachment openings 74. The touch pad input device 1 is attached to the housing 71 of the electronic apparatus 70 in that manner.

Figure 9A:
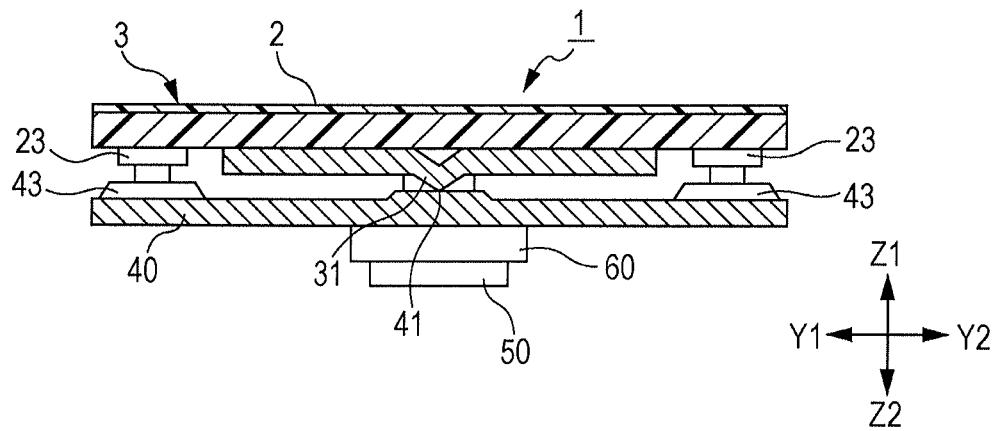
FIGS. 9A to 9C are diagrams illustrating an operation of the touch pad input device in FIG. 2.
Figure 9B:
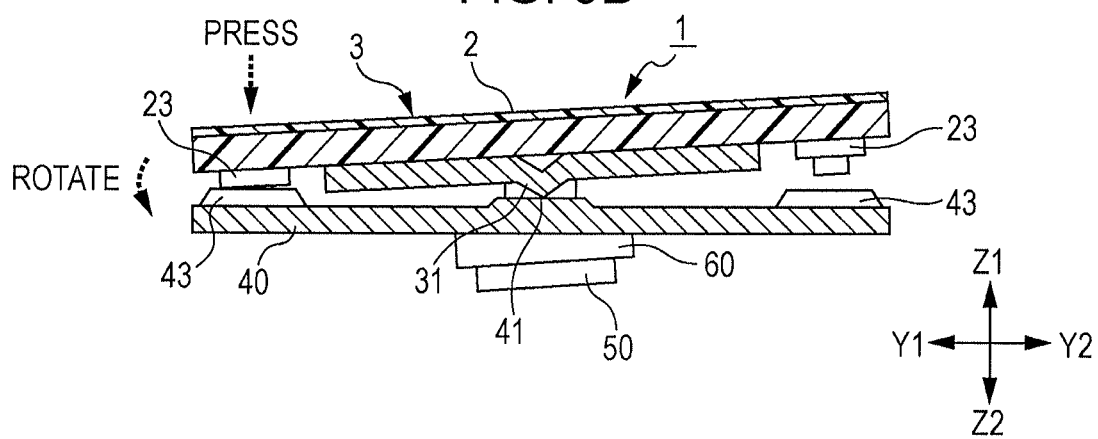
Figure 9C:
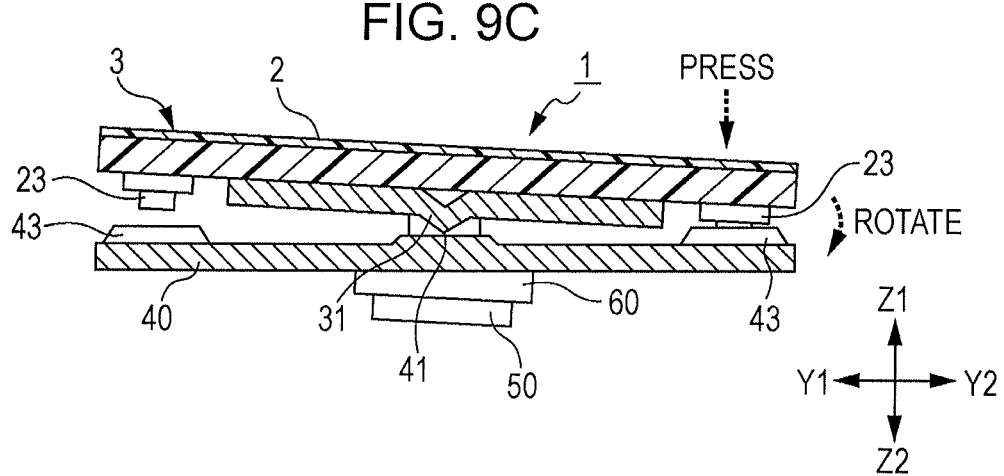

An operation of the touch pad input device 1 when pressed will now be described with reference to FIGS. 9A to 9C. FIGS. 9A to 9C are diagrams illustrating the operation of the touch pad input device 1 illustrated in FIG. 2. FIG. 9A illustrates the touch pad input device 1 before being pressed. FIG. 9B is a diagram illustrating an operation of the touch pad 3 when the front part of the touch pad 3 is pressed. FIG. 9C is a diagram illustrating an operation of the touch pad 3 when the back part of the touch pad 3 is pressed. FIGS. 9A to 9C are schematic views of the cross-section of the touch pad input device 1 taken along the line IX-IX in FIG. 5.

When the front part of the touch pad 3 is pressed downward in FIG. 9B, the touch pad 3 is rotated, thus causing the front end of the touch pad 3 to move downward. The push switch 23 mounted on the front end of the lower surface of the substrate 20 accordingly moves downward, so that the push switch 23 is pressed against the switch support 43. When the touch pad 3 is released from a pressing force, a restoring force of the elastic members 60 allows the touch pad 3 to return to its original state.

When the back part of the touch pad 3 is pressed downward, the touch pad 3 is rotated, thus causing the back end of the touch pad 3 to move downward. The push switch 23 mounted on the back end of the lower surface of the substrate 20 accordingly moves downward, so that the push switch 23 is pressed against the switch support 43. When the touch pad 3 is released from a pressing force, the restoring force of the elastic members 60 allows the touch pad 3 to return to its original state.

The touch pad input device 1 permits the touch pad 3 to be pressed in that manner. The second sensing unit 5 senses rotation of the touch pad 3, caused by pressing the touch pad 3, in response to actuation of the push switch 23.

Advantages of the first embodiment will now be described. In the touch pad input device 1 according to this embodiment, the retaining mechanism 7 urges the touch pad 3 downward to hold the fulcrum portions 31 of the support plate 30 of the touch pad 3 in pressure contact with the abutment portions 41 of the fixed plate 40, thus securely retaining the touch pad 3. In addition, since the retaining mechanism 7 urges the touch pad 3 downward, the retaining mechanism 7 can be placed under the touch pad 3. The placement of the retaining mechanism 7 under the touch pad 3 allows a reduction in footprint of the touch pad input device 1. Thus, the touch pad 3 can be securely retained in the touch pad input device 1 and the footprint of the device can be reduced.

Additionally, in the touch pad input device 1 according to this embodiment, the fixed plate 40 may have the retaining openings 42 extending through the fixed plate 40 from the upper surface of the fixed plate 40 to the lower surface thereof at the predetermined positions and the retaining mechanism 7 may urge the touch pad 3 from under the fixed plate 40 through the retaining openings 42. Consequently, parts (the screw members 50 and the elastic members 60) of the retaining mechanism 7 can be arranged under the fixed plate 40. The arrangement of the parts of the retaining mechanism 7 under the fixed plate 40 allows a reduction of constraints on the height of the retaining mechanism 7, leading to a greater degree of flexibility in the way that the touch pad 3 is retained. This facilitates retaining the touch pad 3. For example, the mechanical strength of each screw member 50 can be enhanced by increasing the thickness of the head 51 of the screw member 50. Furthermore, tactile sensation of pressing can be optimized by increasing the thickness of each elastic member 60.

In a device like the touch pad input device 1, for example, if a support plate 30 includes only one fulcrum portion 31 which is located on one side of a retaining mechanism 7, a force applied by the retaining mechanism 7 would be concentrated on the one side where the fulcrum portion 31 is located. Retaining such a touch pad 3 would be likely to be unstable. In the touch pad input device 1 according to the embodiment, the support plate 30 includes the right and left fulcrum portions 31 which are arranged on the rotation axis of the touch pad 3 on the right and left sides of the retaining mechanism 7. Consequently, the two fulcrum portions 31 arranged on the right and left sides of the retaining mechanism 7 can support the retaining mechanism 7, so that the touch pad 3 can be retained more stably.

In the touch pad input device 1 according to the embodiment, the retaining mechanism 7 may include three kinds of components, the protrusions 32, the screw members 50, and the elastic members 60. This enables the retaining mechanism 7 to have a simplified configuration.

In the touch pad input device 1 according to the embodiment, the fulcrum portions 31 may be formed by bending the support plate 30 of the touch pad 3. This leads to a simplified configuration of the touch pad 3 as well as suppression of an increase in the number of parts.

Second Embodiment

A second embodiment of the present invention will be described below with reference to the drawings. In the description of the second embodiment, the same components as those in the first embodiment are designated by the same reference numerals and a detailed description of the previously described components is omitted.

Figure 10A:
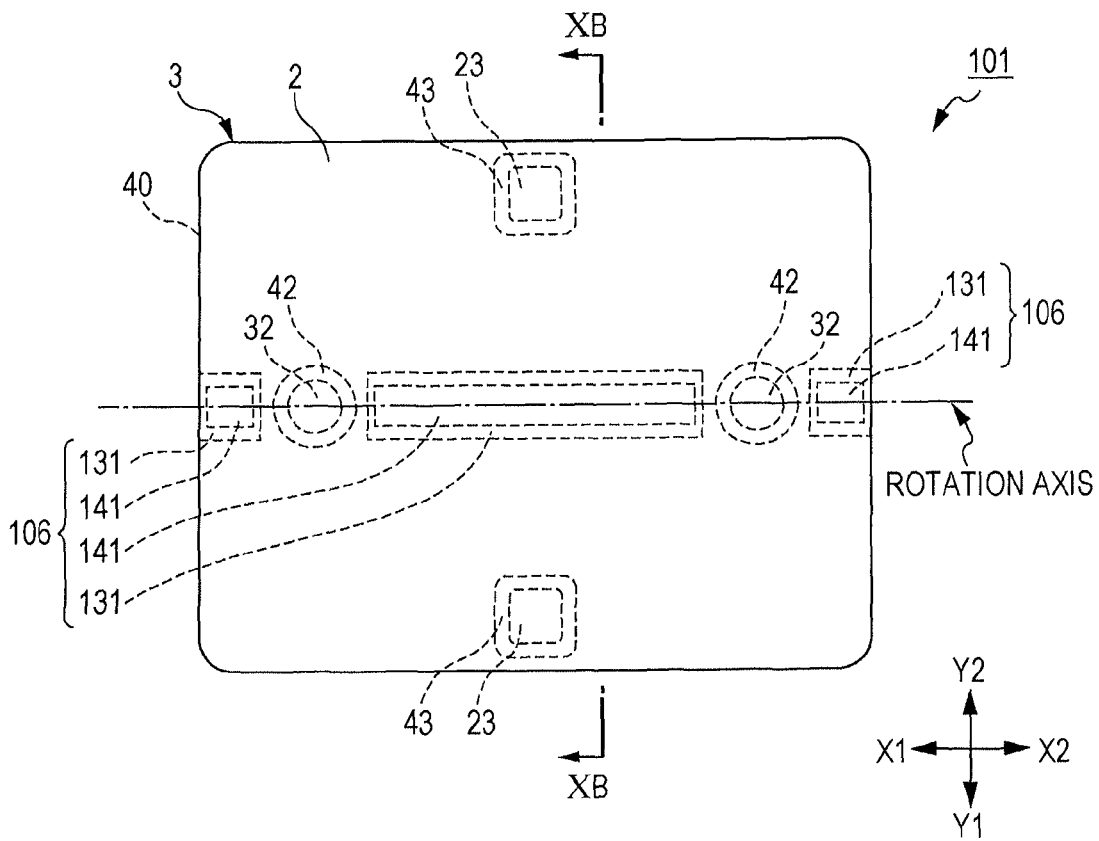
FIGS. 10A and 10B are diagrams illustrating an exemplary configuration of a touch pad input device according to a second embodiment of the present invention.
Figure 10B:
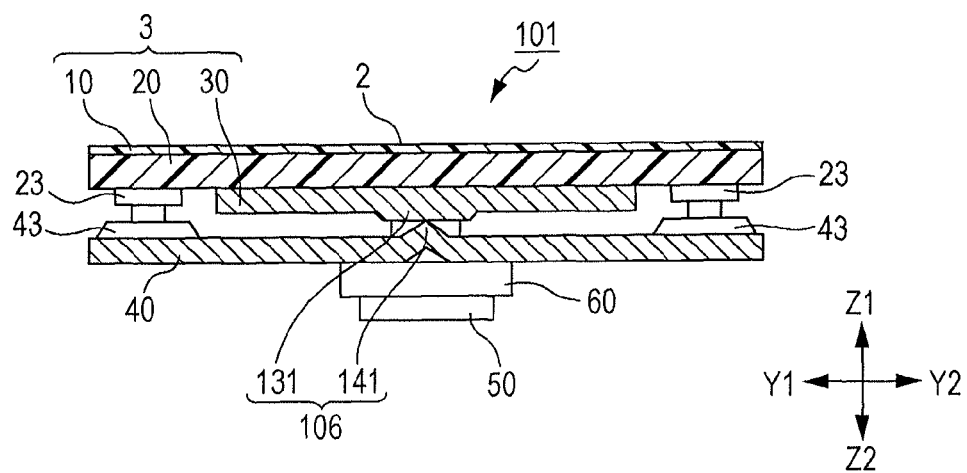

The configuration of a touch pad input device 101 according to the second embodiment of the present invention will now be described with reference to FIGS. 10A and 10B. FIGS. 10A and 10B are diagrams illustrating the configuration of the touch pad input device 101 according to the second embodiment. FIG. 10A is a schematic view of the touch pad input device 101 when viewed from above. FIG. 10B is a schematic cross-sectional view of the touch pad input device 101 taken along the line XB-XB in FIG. 10A.

As illustrated in FIGS. 10A and 10B, the touch pad input device 101 includes a touch pad (movable element) 3 having an operation surface 2, serving as an upper surface, a fixed plate (stationary element) 40 disposed under the touch pad 3, screw members 50, and elastic members 60, each of which is interposed between the fixed plate 40 and the screw member 50. The touch pad 3 is rotatably supported above the fixed plate 40 and is retained so as not to be detached from the fixed plate 40.

The touch pad 3, which is of the capacitive type like in the first embodiment, includes an operation plate 10, a substrate 20, and a support plate 30 superposed on one another. The fixed plate 40 is a plate-shaped metal member. Protrusions 32 provided for the support plate 30, the screw members 50, and the elastic members 60 constitute a retaining mechanism 7.

Unlike in the first embodiment, the fixed plate 40 of the touch pad input device 101 includes fulcrum portions 141, serving as fulcra for rotation of the touch pad 3, instead of the abutment portions 41. The fulcrum portions 141 may be upwardly projecting ridges formed by bending the fixed plate 40 along the rotation axis of the touch pad 3.

The support plate 30 includes abutment portions 131 instead of the fulcrum portions 31. The abutment portions 131 are to contact with the fulcrum portions 141 of the fixed plate 40. The fulcrum portions 141 of the fixed plate 40 and the abutment portions 131 of the support plate 30 constitute a rotation support mechanism 106 for rotatably supporting the touch pad 3.

The retaining mechanism 7 urges the touch pad 3 downward to hold the fulcrum portions 141 of the fixed plate 40 in pressure contact with the abutment portions 131 of the support plate 30. The pressure contact of the fulcrum portions 141 of the fixed plate 40 and the abutment portions 131 of the support plate 30 reduces or prevents movement except rotation of the touch pad 3, thus preventing the touch pad 3 from being detached from the fixed plate 40 in a pressing operation.

Advantages of the present embodiment will now be described. In the touch pad input device 101 according to this embodiment, the retaining mechanism 7 urges the touch pad 3 downward to hold the fulcrum portions 141 of the fixed plate 40 in pressure contact with the abutment portions 131 of the support plate 30 of the touch pad 3, thus securely retaining the touch pad 3. Since the retaining mechanism 7 urges the touch pad 3 downward, the retaining mechanism 7 can be placed under the touch pad 3. The placement of the retaining mechanism 7 under the touch pad 3 allows a reduction in footprint of the touch pad input device 101. Thus, the touch pad 3 can be securely retained in the touch pad input device 101 and the footprint of the device can be reduced.

In the touch pad input device 101 according to the embodiment, the fulcrum portions 141 may be formed by bending the fixed plate 40. This leads to a simplified configuration of the fixed plate 40 as well as suppression of an increase in the number of parts.

Third Embodiment

A third embodiment of the present invention will be described below with reference to the drawings. In the description of the third embodiment, the same components as those in the first embodiment are designated by the same reference numerals and a detailed description of the previously described components is omitted.

Figure 11A:
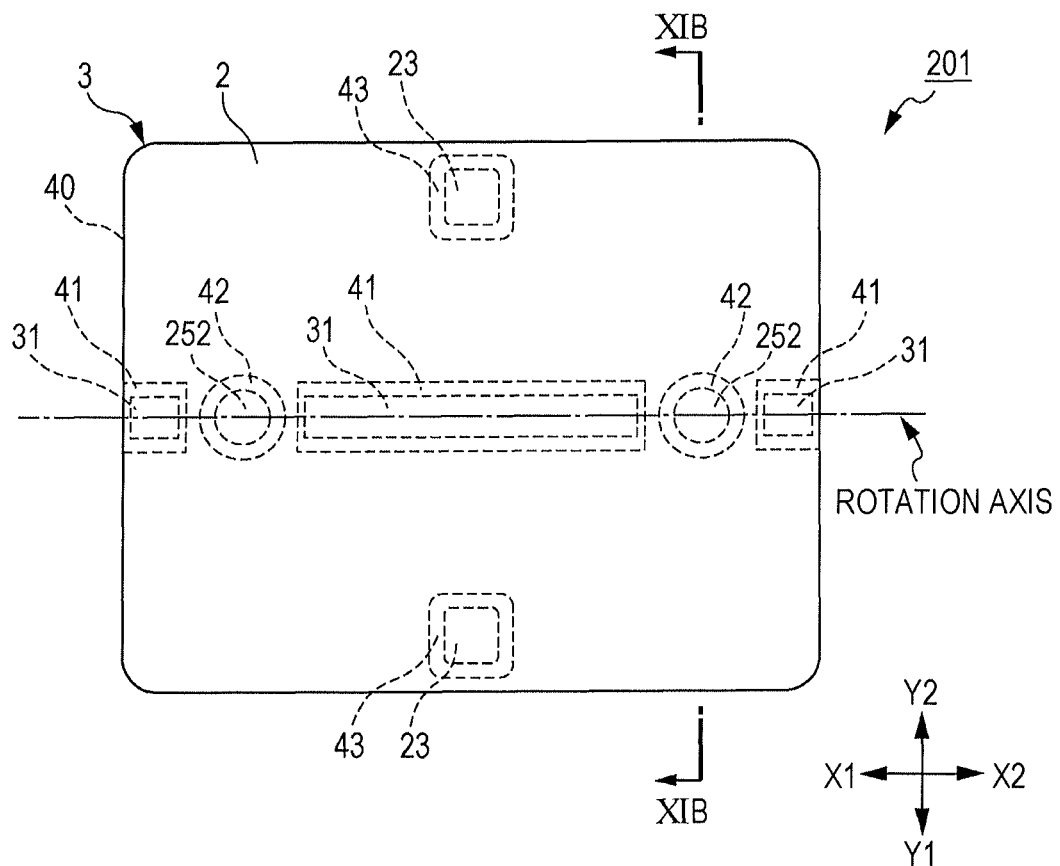
FIGS. 11A and 11B are diagrams illustrating an exemplary configuration of a touch pad input device according to a third embodiment of the present invention.
Figure 11B:
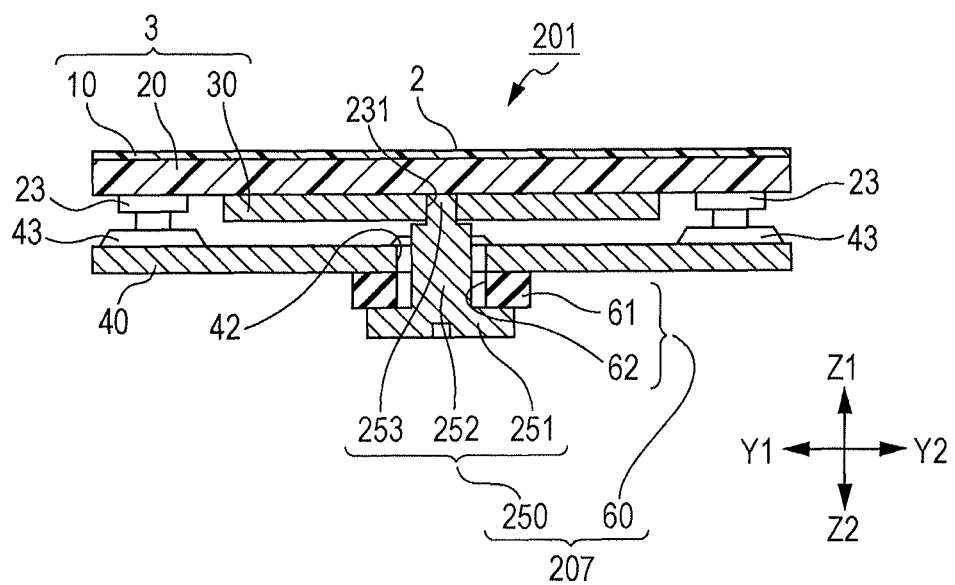
Figure 13:
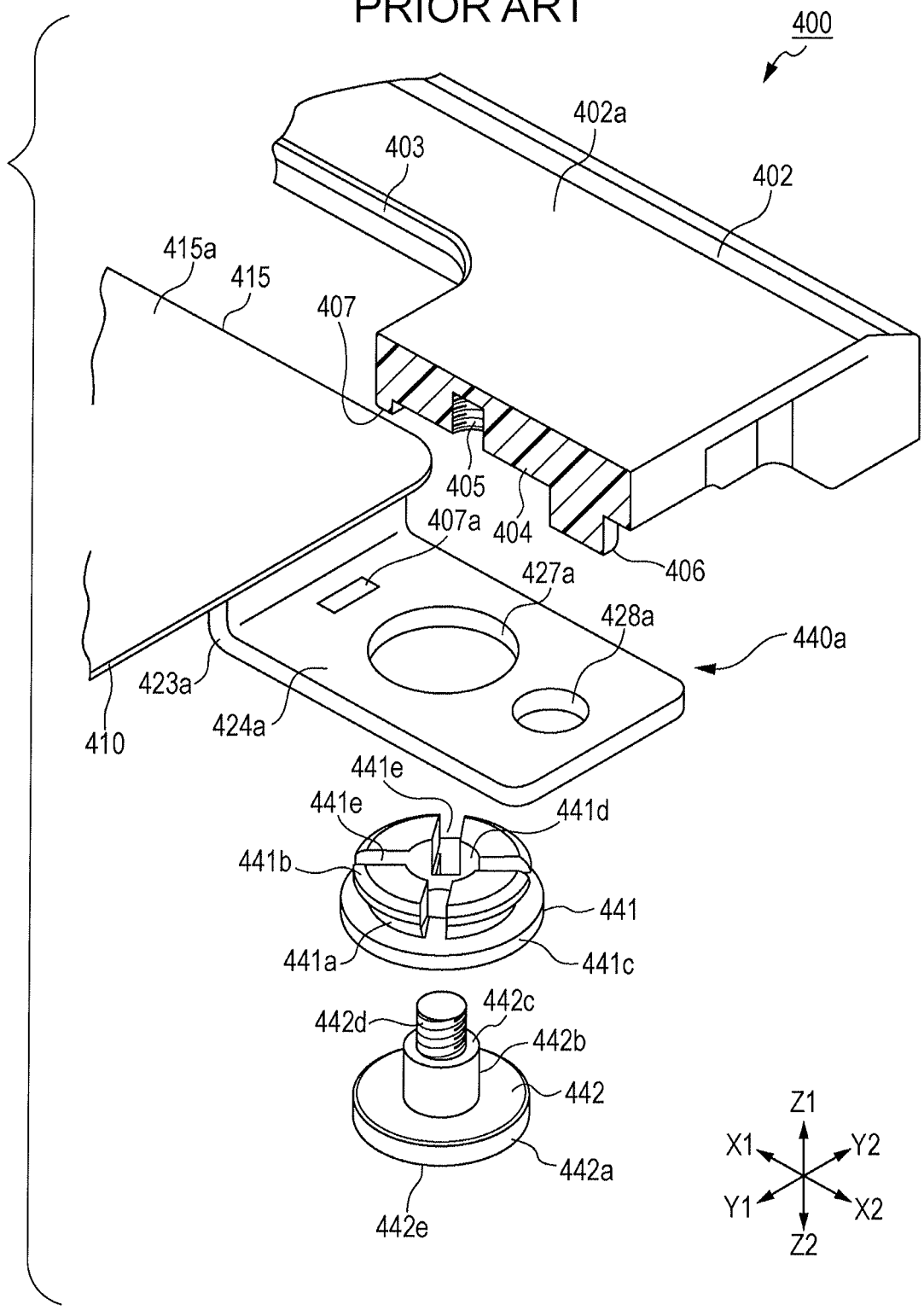
FIG. 13 is a diagram illustrating the configuration of an input device disclosed in Japanese Unexamined Patent Application Publication No. 2013-164699.

The configuration of a touch pad input device 201 according to the third embodiment of the present invention will now be described with reference to FIGS. 11A and 11B. FIGS. 11A and 11B are diagrams illustrating the configuration of the touch pad input device 201 according to the third embodiment. FIG. 11A is a schematic view of the touch pad input device 201 when viewed from above. FIG. 11B is a schematic cross-sectional view of the touch pad input device 201 taken along the line XIB-XIB in FIG. 11A.

As illustrated in FIGS. 11A and 11B, the touch pad input device 201 includes a touch pad (movable element) 3 having an operation surface 2, serving as an upper surface, a fixed plate (stationary element) 40 disposed under the touch pad 3, screw members 250, and elastic members 60, each of which is interposed between the fixed plate 40 and the screw member 250. The touch pad 3 is rotatably supported above the fixed plate 40 and is retained so as not to be detached from the fixed plate 40.

The touch pad 3, which is of the capacitive type like in the first embodiment, includes an operation plate 10, a substrate 20, and a support plate 30 superposed on one another. The fixed plate 40 is a plate-shaped metal member. The support plate 30 includes fulcrum portions 31, serving as fulcra for rotation of the touch pad 3. The fixed plate 40 includes abutment portions 41 to contact with the fulcrum portions 31 of the support plate 30. The fulcrum portions 31 of the support plate 30 and the abutment portions 41 of the fixed plate 40 constitute a rotation support mechanism 6 for rotatably supporting the touch pad 3.

Unlike in the first embodiment, the support plate 30 in the touch pad input device 201 has threaded holes 231, into which the screw members 250 are screwed, instead of the protrusions 32. Each of the screw members 250 includes a disk-shaped head 251 having an upper planar surface and a lower planar surface, a substantially cylindrical stem 252 extending upwardly from the upper surface of the head 251, and a threaded extremity 253 extending from the stem 252. The screw members 250 and the elastic members 60 constitute a retaining mechanism 207 for retaining the touch pad 3 so as not to detach the touch pad 3 from the fixed plate 40 in a pressing operation.

The cylindrical stem 252 of each screw member 250 has an outside diameter smaller than the inside diameter of a retaining opening 42 of the fixed plate 40 and the inside diameter of a through hole 62 of the elastic member 60. The stem 252 can extend through the retaining opening 42 of the fixed plate 40 and the through hole 62 of the elastic member 60. The disk-shaped head 251 has a larger outside diameter than the cylindrical stem 252. Consequently, the head 251 is wider than the stem 252. The threaded extremity 253 is screwed in the threaded hole 231 of the support plate 30.

Each of the screw members 250 is attached such that the stem 252 upwardly extends sequentially through the through hole 62 of the elastic member 60 and the retaining opening 42 of the fixed plate 40 and the threaded extremity 253 protrudes beyond an upper surface of the fixed plate 40. The threaded extremity 253 is screwed into the threaded hole 231 of the support plate 30. After the screw member 250 is screwed on the support plate 30, a body 61 of the elastic member 60 is interposed between an attachment surface 45 of the fixed plate 40 and the head 251 of the screw member 250. The elastic members 60 downwardly urge the touch pad 3 with its elasticity to hold the fulcrum portions 31 of the support plate 30 in pressure contact with the abutment portions 41 of the fixed plate 40.

Advantages of this embodiment will now be described. In the touch pad input device 201 according to this embodiment, the retaining mechanism 207 urges the touch pad 3 downward to hold the fulcrum portions 31 of the support plate 30 of the touch pad 3 in pressure contact with the abutment portions 41 of the fixed plate 40, thus securely retaining the touch pad 3. Since the retaining mechanism 207 urges the touch pad 3 downward, the retaining mechanism 207 can be placed under the touch pad 3. The placement of the retaining mechanism 207 under the touch pad 3 allows a reduction in footprint of the touch pad input device 201. Thus, the touch pad 3 can be securely retained in the touch pad input device 201 and the footprint of the device can be reduced.

In the touch pad input device 201 according to this embodiment, the retaining mechanism 207 may include two kinds of components, the screw members 250 and the elastic members 60. Thus, the configuration of the retaining mechanism 207 can be simpler than that of the retaining mechanism 7 in the first embodiment.

While the present invention has been described with reference to the exemplary embodiments thereof, those skilled in the art will be able to make various modifications to the described embodiments of the invention without departing from the intended scope of the invention.

For example, the electronic apparatus in which the touch pad input device 1, the touch pad input device 101, or the touch pad input device 201 according to any of the embodiments of the present invention is mounted may be any apparatus other than the laptop computer. For example, each of the touch pad input device 1, the touch pad input device 101, and the touch pad input device 201 may be used as an input device for, for example, a game console or an in-vehicle navigation system. The touch pad 3 is not limited to being of the capacitive type. The touch pad 3 may be of the resistive type or the optical type.

In the above-described embodiments of the invention, the push switch 23 may be mounted on either the front end or the back end of the touch pad 3 and the second sensing unit 5 may sense either a pressing operation on the front part of the touch pad 3 or a pressing operation on the back part thereof. The second sensing unit 5 may sense rotation using a component other than the push switch.

In the above-described embodiments, the touch pad 3 may include another component in addition to the operation plate 10, the substrate 20, and the support plate 30. For example, an electrode layer including a communication antenna or the like may be disposed under the substrate 20.

In the above-described embodiments, the protrusions 32 may have a different shape from that described above and may be arranged in a different pattern from that described above. For example, each of the protrusions 32 may be a truncated cone extending downward. In this case, the protrusions 32 may be integrated with the support plate 30. Alternatively, the protrusions 32 may be bonded to the support plate 30 with an adhesive or the like.

In the above-described embodiments, the elastic members 60 may be interposed between the support plate 30 and the fixed plate 40 as long as the elastic members 60 achieve a predetermined function. The elastic members 60 bonded to the upper surface of the fixed plate 40 by an adhesive or the like may urge the touch pad 3 downward by pulling the lower surface of the support plate 30 downward.

In the above-described embodiments, each of the operation plate 10, the substrate 20, and the support plate 30 of the touch pad 3 may be composed of a different material from that described above as long as this component achieves a predetermined function. For example, the support plate 30 may be composed of plastic. The operation plate 10 may be formed on the substrate 20 by applying a material, such as plastic, to the upper surface of the substrate 20.

In the above-described embodiments, each of the fixed plate 40 and the screw member 50 may be composed of a different material from that described above as long as the component achieves a predetermined function. In addition, a plastic sheet for protecting against wear may be fixed to each of the abutment portions 41 of the fixed plate 40. Each of the elastic members 60 may be a metal spring or the like so long as this component has predetermined elasticity. Furthermore, the touch pad 3 may be urged downward by using a component other than the elastic members 60.

What is claimed is:

1. A touch pad input device comprising:
a movable element having an upper surface that serves as an operation surface;
first sensor that senses a touch or proximity of an operating object on or to the operation surface;
a stationary element disposed under the movable element;
a rotation support mechanism rotatably supporting the movable element;
second sensor that senses rotation of the movable element; and
a retaining mechanism that retains the movable element,
wherein the rotation support mechanism includes
a fulcrum portion arranged on one of the movable element and the stationary element, the fulcrum portion being positioned under the movable element in an area covered by the operation surface when viewed from above, and
an abutment portion arranged on the other one of the movable element and the stationary element so as to contact with the fulcrum portion,
wherein the retaining mechanism is positioned under the movable element in the area covered by the operation surface when viewed from above, and wherein the retaining mechanism urges the movable element downward to hold the fulcrum portion in pressure contact with the abutment portion.

2. The device according to claim 1,
wherein the stationary element has an opening at a predetermined position, the opening extending through the stationary element from an upper surface of the stationary element to a lower surface thereof at a predetermined position, and
wherein the retaining mechanism urges the movable element from under the stationary element through the opening.

3. The device according to claim 2,
wherein the retaining mechanism includes
   a protrusion fastened to a lower surface of the movable element, the protrusion extending through the opening beyond the lower surface of the stationary element,
   a screw member screwed on a lower end of the protrusion, the screw member including a head wider than the protrusion, and
   an elastic member interposed between the stationary element and the head of the screw member, the elastic member elastically urging the protrusion downward.

4. The device according to claim 2,
wherein the retaining mechanism includes
   a screw member extending from under the stationary element through the opening and being screwed on the movable element, and
   an elastic member elastically urging the movable element downward,
wherein the screw member includes
   a stem extending through the opening beyond the upper surface of the stationary element, and
   a head wider than the stem, and
wherein the elastic member is interposed between the stationary element and the head of the screw member.

5. The device according to claim 1, wherein the fulcrum portions are arranged on an axis of rotation of the movable element on opposite sides of the retaining mechanism.

6. The device according to claim 1, wherein the fulcrum portions are downwardly projecting ridges formed by partly bending the movable element along an axis of rotation of the movable element.

7. The device according to claim 1, wherein the fulcrum portions are upwardly projecting ridge formed by partly bending the stationary element along an axis of rotation of the movable element.

* * * * *